United States Patent
Diancin et al.

(10) Patent No.: US 11,281,684 B2
(45) Date of Patent: Mar. 22, 2022

(54) ELECTRONIC DEVICE DESCRIPTION LANGUAGE (EDDL) SEARCH AND NAVIGATION ASSISTANT

(71) Applicant: FISHER-ROSEMOUNT SYSTEMS, INC., Round Rock, TX (US)

(72) Inventors: Irene Aquino Diancin, Pflugerville, TX (US); Joseph Aballe Bacus, Eden Prairie, MN (US); Jehiel Camille Geronimo Balla, Biñan (PH); Wynn Gervacio Diancin, Pflugerville, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 16/717,576

(22) Filed: Dec. 17, 2019

(65) Prior Publication Data

US 2021/0182281 A1    Jun. 17, 2021

(51) Int. Cl.
 *G06F 16/248*        (2019.01)
 *G06F 9/451*         (2018.01)
 *G06F 16/245*        (2019.01)
 *G06Q 50/04*         (2012.01)

(52) U.S. Cl.
 CPC ............ *G06F 16/248* (2019.01); *G06F 9/451* (2018.02); *G06F 16/245* (2019.01); *G06Q 50/04* (2013.01)

(58) Field of Classification Search
 CPC ...... G06F 16/248; G06F 9/451; G06F 16/245; G06F 16/90324; G06F 16/90328; G06F 16/90344; G06F 16/9038; G06F 16/9538; G06Q 50/04; G05B 19/41845
 See application file for complete search history.

(56) References Cited

U.S. PATENT DOCUMENTS

| | | | |
|---|---|---|---|
| 2011/0239109 A1* | 9/2011 | Nixon | G06F 16/972 715/236 |
| 2012/0004743 A1* | 1/2012 | Anne | G05B 19/409 700/83 |
| 2012/0062577 A1* | 3/2012 | Nixon | G05B 23/0272 345/522 |
| 2012/0078869 A1* | 3/2012 | Bellville | G06F 17/30943 707/706 |
| 2017/0176982 A1* | 6/2017 | Lutz | G05B 19/0423 |
| 2017/0270174 A1* | 9/2017 | Runov | G06F 16/248 |
| 2018/0059921 A1* | 3/2018 | De Ligt | G06F 3/04847 |
| 2018/0113573 A1* | 4/2018 | Kulus | G06F 3/0482 |

* cited by examiner

*Primary Examiner* — Jennifer N Welch
*Assistant Examiner* — K C Chen
(74) *Attorney, Agent, or Firm* — Marshall, Gerstein & Borun LLP

(57) ABSTRACT

A method of and system for implementing a search function to bypass a sequential hierarchical menu selection path to access a device parameter, where hierarchical menus are generated based on an electronic device description (EDD) and interpreted using an EDD engine. The search function provides a first parameter result set without rendering display characteristics to provide a user a simple initial display of possible matches. A user selection of a desired device parameter is received and a device parameter view may be retrieved containing the desired device parameter and rendered on a user interface.

19 Claims, 12 Drawing Sheets

ELECTRONIC DEVICE DESCRIPTION LANGUAGE (EDDL) SEARCH AND NAVIGATION ASSISTANT

FIELD OF DISCLOSURE

The present disclosure relates to process control systems and more specifically to methods of and systems for accessing and displaying plant device parameters and functions using electronic device descriptions and electronic device description interpreters.

BACKGROUND

Process control systems used in industrial processes may include at least one host or operator workstation communicatively coupled to one or more process controllers via one or more input/output (I/O) interface devices. The process controllers may communicate with one or more field devices via analog, digital or combined analog/digital buses. The field devices, which may be, for example valves, valve positioners, switches and transmitters/sensors (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. As described herein, field devices, controllers, and other plant devices, such as input/output interfaces, are generally referred to as "process control devices," or "control devices."

Information from the process control devices may be made available to one or more applications (i.e., routines, programs, etc.) executed by an operator workstation (e.g., a processor-based system) to enable an operator to perform desired functions with respect to the process, such as viewing the current state of the process (e.g., via a graphical user interface), evaluating the process, modifying an operation of the process (e.g., via a visual object diagram), etc. In some systems, a workstation application may be an electronic device description (EDD) engine or an EDD interpreter used to communicate with an electronic device such as a process control device based on an electronic device description (EDD) file of the process control device. In this system, device parameters and functions may be accessed via a series of device parameter screens or views. The device parameter screens or views may be constructed as specified by a process control device's EDD file and displayed as a user interface at the workstation or other computing device communicatively coupled to the workstation.

Generally, an electronic device description (EDD) file, or described herein sometimes as an EDD, may be used within process control systems to provide a structured and/or standardized format to describe and specify parameters and functions of process control devices. Electronic device description language (EDDL) is generally used to create or write an EDD file. An EDD engine or interpreter running, for example, on a workstation, controller, or other computing device, is software used to interpret or translate the EDD files and to facilitate access, control and/or management of process control devices. A human machine interface or user interface software may be used to display graphical representations (e.g., views or device screens) of device parameter information from process control devices based on what is specified by the EDD files, interpreted by the EDD engine, and communicated to the user interface (sometimes referred to as a human machine interface or HMI) from the EDD engine. In this system, EDD files may specify a visualization of process control information based on parameters associated with a device and based on communication between the EDD engine and the device.

The device parameter screens or views generated by the EDD engine may contain a set of parameters with links to other views with different sets of parameters, as specified by an EDD. The device parameter screens may be organized in a hierarchical manner (e.g., hierarchical menu or menu tree) where accessing a desired device parameter may involve clicking through a sequence of device parameter screens to access a device parameter screen containing the desired parameter. This manner of accessing a process control device parameter may be cumbersome. In particular, an EDD may specify a large number of device screens that often require a user to navigate through multiple screens to reach a desired parameter. The number of device screens or views may be proportional to the number of parameters and complexity of the particular device. Of course, sometimes a user may, by happenstance, find a target parameter in an initial first or second device screen, however, generally, multiple views or screens are traversed before reaching a desired screen or view containing a desired device parameter.

In some situations, an experienced user may know a path (i.e., a sequence of screens) to access a particular parameter, thereby making access more efficient. For example, to navigate to a particular device parameter screen a user may know that the device may be located by selecting the third option of the first view, the fifth option of the second view, and the second option of the third view. In this case, knowing how to click through to a desired parameter may save time. However, for new users and inexperienced users, discovering a path to a target view generally involves reading each option on each device screen, thinking about which option is correct, and making the correct selections to navigate to a desired parameter. Even with careful consideration of the presented view items or elements, sometimes selection of an incorrect option may occur, thereby requiring even more time to navigate to a correct device screen containing a desired device parameter.

SUMMARY

The claimed method and system includes querying for a set of device parameters associated with an electronic device, applying a first search algorithm based on a first user input to the index of parameter identifiers to produce a first parameter result set, and displaying the first parameter result set without rendering display characteristics of the first parameter result set. The claimed method and system includes receiving a user selection of a device parameter, retrieving a second parameter result set based on the user selection, and displaying the second parameter result set including rendering display characteristics of the second parameter result set.

The second parameter result set may include a view of a device parameter screen as part of a manufacturer provided menu screen, as specified in an EDD file. In an embodiment, the second parameter result set may include an identifier, display attributes, and a current value(s) of the user selected device parameter. In an embodiment, the system may forego displaying the manufacturer provided device parameter screen for a simplified target device parameter screen. The simplified target device parameter screen may use different display attributes than those specified by the manufacturer provided menu screen for the same target device parameter.

In an embodiment, the method and system may be implemented using electronic device description language specification in an EDD file. In an embodiment, the method and system may be implemented in a user interface description portion of the EDD file. In an embodiment, the method and system may be implemented in a user interface plug-in component of a system under a field device integration standard.

DETAILED DESCRIPTION

Figure 1:
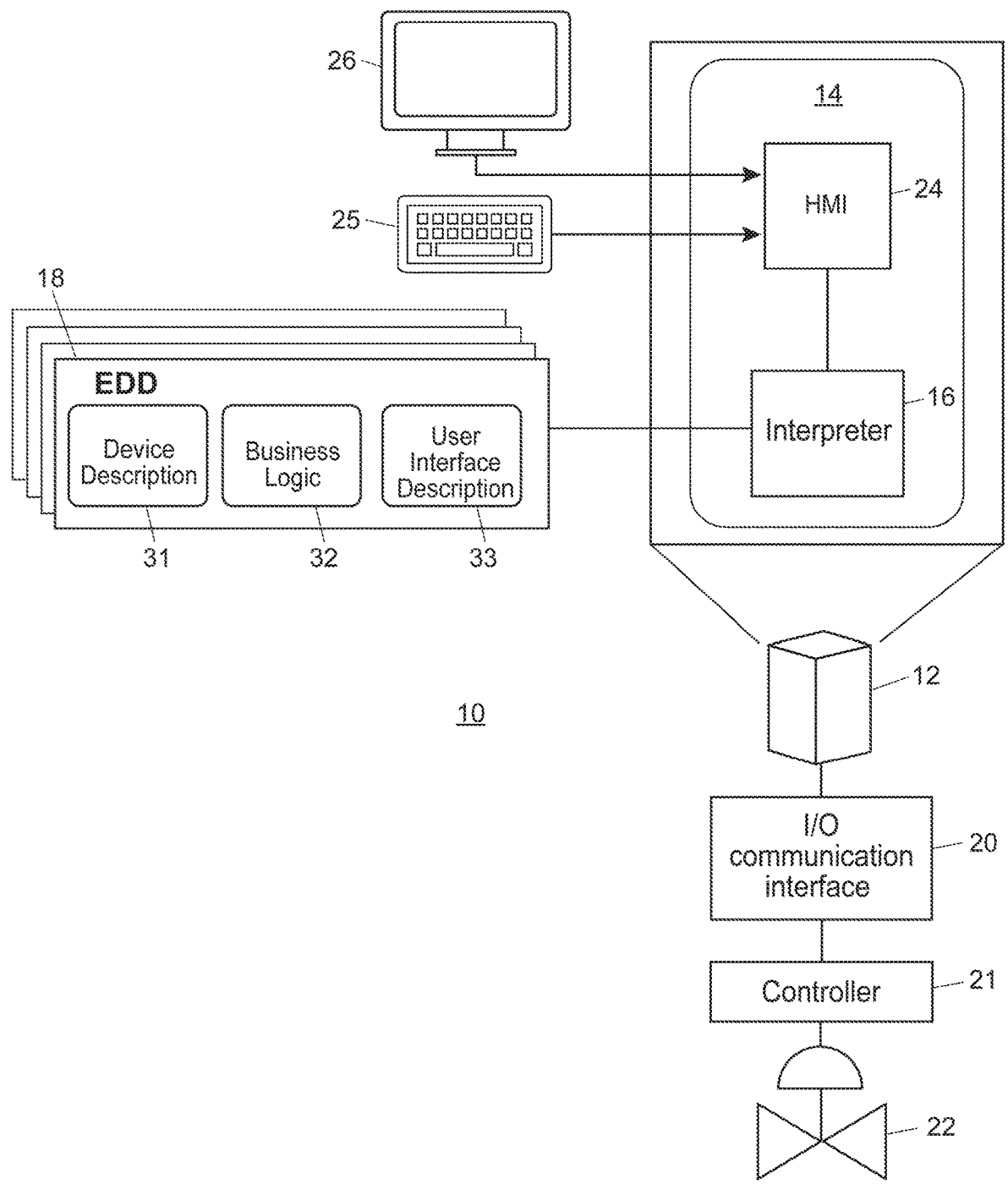
FIG. 1 illustrates a system for accessing an electronic device using electronic device description (EDD).

FIG. 1 illustrates a portion of a process control system 10 that includes a workstation 12 running an electronic device description (EDD) host application 14. The host application 14 may include an EDD engine 16 or interpreter. As used herein, an electronic device description and a device description has similar or same meanings and is generally created using electronic device description language (EDDL). The host application 14 may be adapted to receive and manage EDD files 18 for one or more process control devices 20, 21, and 22 in the process control system 10. A user interface or a human machine interface (HMI) 24, may be in communication with the EDD engine or interpreter 16 to access a process control device, such as a input/output interface 20, process controller 21, or field device 22. The user interface 24 may communicate with the EDD engine 16 to receive visualization information that is rendered on a display 26 of the user interface 24 and may include views of parameters and functions of a process control device 20, 21, or 22. The displayed views may include graphical representations of parameters and their current values. The manner in which the displays are organized and the types of views available may be specified by the EDD 18 and are provided to the HMI or user interface 24 by the EDD engine 16 of the host application 14. In some embodiments, a host application 14 may include both an HMI/user interface 24 and an EDD engine 16. (see FIG. 1). In other embodiments, a host application running on a first computing device may include the EDD engine, while a second host application on a second, different computing device may include an HMI, where the first computing device may act as a client and the second computing device may act as a server. In this model, multiple clients may access the same server to communicate with a process control device using an EDD engine. The EDD engine may access and catalogue device descriptions and provide a common set of interfaces for accessing a process control device that is modeled or specified by the EDD of the process control device.

The example HMI or user interface 24 of FIG. 1 may generate displays showing process control information from the field devices 22 based on EDD files 18 managed by the EDD engine 16. In this manner, a user of workstation 12 implementing the HMI 24 may view process control information associated with the field devices 22. To display process control information, for example, the user interface 24 may receive a request from a user of the workstation 12 using an input device 25 (e.g., a keyboard, a mouse, etc.) to view information associated with the field devices 22 within the process control system 10.

The example user interface 24 may then communicate the request to the EDD engine or interpreter 16, which in turn accesses a corresponding EDD file 18 associated with the requested field device(s) 22. It should be noted that in some embodiments, EDD files may correspond to process control devices such as those in a distributed process control system such as a field device or process controller, however, an electronic device description (EDD) may be used to describe any electronic device and the methods and systems described herein may also be applicable to any electronic device that may be described using EDDL, even devices that are not part of a process control system.

FIG. 1 illustrates that an EDD generally includes device data or a device definition 31, business logic (BL) 32 and a user interface description (UID) 33. The EDD engine or interpreter 16 may read the EDD files 18 for instructions on how process control information or device information is to be displayed. In some instances, the EDD files 18 may include instructions for displaying one or more views. Generally, as used herein, a view includes a set of parameters and display characteristics associated with a set of parameters, where the display characteristics are instructions on how to display the set of parameters. In some systems, each device parameter may have its own set of display characteristics and a view may include one or more device parameters along with their corresponding display characteristics. In some systems, each device parameter may have a set of display characteristics that are determined by a view containing the device parameters. In some embodiments, the parameter information required for a device parameter screen may be retrieved from a database view. In some instances, the EDD files 18 may include instructions for displaying menu(s) or views as part of the host application. The EDD files 18 may provide descriptions of functions for each item within the menu(s). The EDD files 18 may also include instructions defining how graphic(s) are to be displayed within a view. For example, an EDD file may include instructions defining dimensions, layout, formatting, and/or placement of parameter text. In another example, an EDD file 18 may include instructions defining dimensions, layout, formatting, placement, data fields, and/or placement of an image or other graphical display object. Generally, the display characteristics may include commonly known graphical user interface (GUI) elements such as a panel, menu, text box, as well as elements for displaying parameter values such as graphs, tables, charts, etc.

In another example, an EDD file 18 may contain a link and/or reference to an image to be displayed within the application 14. To display an image within a view, the example user interface 24 of FIG. 1 may use instructions within the EDD file 18 to construct, format, and/or position the image. In some examples, the EDD file 18 may include a reference and/or a link to a database of images (not shown) that the display interface 24 accesses to locate a referenced graphic. In this manner, the display interface 24 may display pre-made graphics (e.g., clip art, pictures, animations, etc.) that are referenced within the EDD file.

The example user interface 24 may also render a referenced graphic with corresponding live process control information for display within the application 14. In this example, the EDD engine 16 may communicate with or query a field device 22 for corresponding device parameter values when an HMI is requesting views that require displaying those parameters and parameter values. The example user interface 24 of FIG. 1 may combine graphics with process control information by using references and/or links within the EDD files 18 to process control information stored within a device, such as field device 22. For example, an EDD file describing a table graphic may include references for each of the table cells to a parameter (e.g., a parameter value). The reference may include a directory location within a memory, a location within a hierarchical data scheme, an internet address of a server hosting process control information (e.g., a server associated with OPC UA), and/or a location within the field device 109 specified by parameters that correspond to the device information. The user interface 102 may use the links and/or references to insert and/or combine the process control information or parameter values with graphics or graphical objects. For example, the user interface may initiate a query via the EDD engine 16 to retrieve current device parameter values from a live field device 22 for display. The display interface 24 may then render the graphics with the process control information using instructions provided by the EDD engine 16 to display the process control information or device information graphically.

In some example systems, the EDD engine 16 and/or associated elements of the EDD engine 16 may generate extensible markup language (XML) representations of a user interface as described by an EDD 18. In this example system, the EDD engine 16 may read an EDD file 18 and interpret the EDD into a series of XML files that when rendered on a display 26 provide visual representations of a user interface for accessing a device corresponding to the EDD. For example, after reading an EDD file 18 corresponding to a field device, such as a temperature sensor, the EDD engine 16 may generate a main menu screen or view in the form of an XML page or document. This page may be retrieved and accessed by the HMI 24 which displays the XML on an attached monitor 26, similar to a web browser. The user may then interact with the displayed XML page by, for example, clicking through various parameters to retrieve additional views or screens as specified in the EDD 18 and translated into XML pages via the EDD engine 16. In this model, the EDD engine 16 may act as a server, while the HMI 24 may act as a client. In one embodiment, the EDD engine may be adapted or modified to generate visual representations of the user interface using JavaScript object notation (JSON) in addition or in lieu of using XML.

Figure 2:
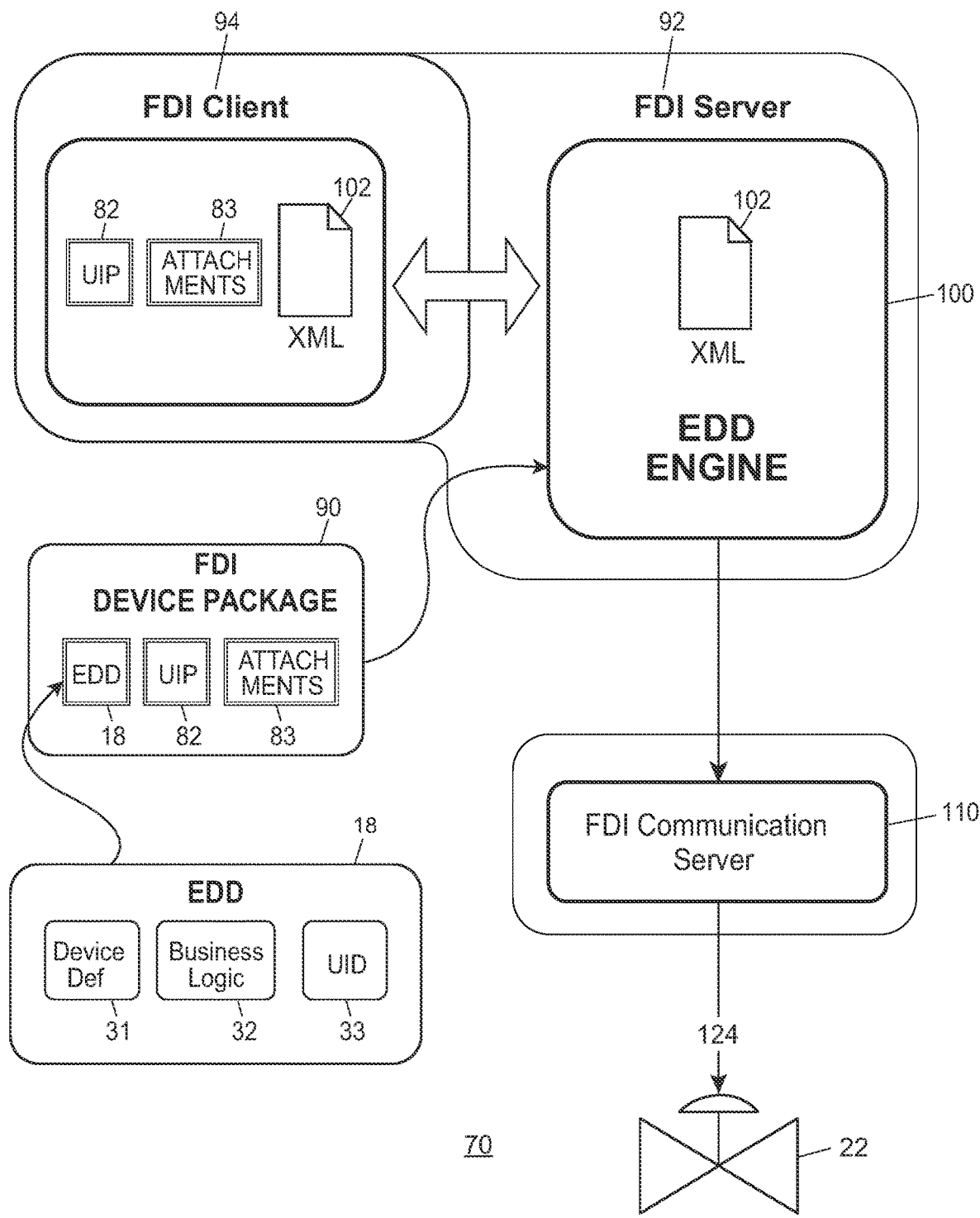
FIG. 2 illustrates an implementation of an EDD system in a process control plant using industry standard field device integration (FDI).

FIG. 2 illustrates a particular implementation of an EDD based system for accessing process control devices in a process control system. The system of FIG. 2 may be used to illustrate an industry standard EDD based system called a field device integration (FDI) system or model. The FDI system was developed from cooperation of major process automation suppliers and standards organizations. The FDI system may be designed to communicate with devices throughout a process plant across different protocols for the management of device information. In this system, a host may include an FDI server and an FDI client.

In an FDI system 70 such as that illustrated in FIG. 2, a device, such as field device 22, may have an EDD 18 similar to that described in FIG. 1 (labeled similarly). The EDD 18 for a device may include at least a device definition 31, business logic 32, and a user interface description (UID) 33. In the FDI system, the EDD 18 for a device may be encapsulated in a standardized FDI device package 90. An FDI device package 90 may include an EDD 18, a user interface plug-in (UIP) 82 and attachments 83 specific to an electronic device. In this system, each device 22 of the FDI system 70 is represented by an FDI device package 90. Generally, device 22 may be any device in a process plant described using an FDI package 90. The UIP 82 of the FDI device package 90 may generally allow for host machine specific graphical and processing functionality beyond the capabilities that can be described using just a UID 33 in EDD 18. For example, the UIP 82 may allow for host machine specific graphical and processing functionality over and above what can be specified in the UID 33 of the EDD 18 and interpreted by the EDD engine. Attachments 83 of the FDI device package 90 may include device related graphics and pictures, registration certificates, data sheets, user manuals, and communication protocol specification files such as GSD (General Station Description), CFF (Common File Format), etc.

An EDD file 18 may contain a user interface description (UID) 33 that uses current industry standard EDDL functions for specifying the visual representation of a parameter set. The UID 33 may contain basic visual elements such as windows, tabs, input fields, buttons and some complex elements such as trends, gauges, and bar graphs. More complicated graphics outside the range available to be encoded via EDDL may be needed on occasion. In these situations, an EDD based device access system may use additional components or add-ons to enhance the graphics capability of an EDDL defined user interface description 33. In a system implementing an FDI system 70, an enhanced device function or parameter presentation may be implemented using a user interface plug-in (UIP) 82 which is host system specific and may be able to take advantage of more powerful graphical rendering elements than specified by the UID 33. As EDDL specifications become more robust, additional features may be supported by UID 33.

An FDI server 92 may be adapted to import and manage FDI device packages 90, read and interpret the content of the FDI device packages 90, and when initiated, to create a series of graphical instructions that allow an FDI client 94 communicatively coupled to the FDI server 92 to access a process control device function and read device parameter values. The FDI server 92 may include an FDI EDD engine 100 for reading the EDD 18 contained in the FDI device packages 90 where the FDI server 92 may create graphical user interfaces 102, such as views, that are available to the FDI client 94. The FDI client 94 may communicate with the FDI server 92 to retrieve the graphical instructions in the form of, for example, XML based representations and render those graphics on a display device to a user. In this respect, the FDI client 94 acts as an HMI similar to that illustrated in FIG. 1. The FDI client 94 may also import and execute the user interface plug-in (UIP) 82 of the FDI device package 90 for a particular device 22. As discussed, certain functions and graphical interfaces may be implemented by the UIP 82 that are outside of what is specified by the UID 33 or provide enhancements to what is specified by the UID 33.

Generally, the FDI server 92 may be a workstation, a process controller, a field device, or any other computing device communicatively coupled to an electronic device described by an EDD 18 or FDI device package 90. In some instances the FDI server 92 may have a direct communication link with the electronic device 22 as illustrated by communication link 124 of FIG. 2. In other instances, the FDI server 92 may be in communication with the electronic device 22, such as a process control device, via a communication interface or input/output (I/O) device. In the case of an FDI system 70 as illustrated in FIG. 2, an FDI server 92 may be adapted to use a universal communication platform with appropriate communication interfaces to communicate with various process control devices on disparate communication protocols or legacy systems generally incompatible with current industry standards. The FDI communication platform may include an FDI communication server 110 coupled to the FDI server 92. The FDI communication server 92 may be used for integration of non-native field protocols and may support the integration of communication with devices in heterogeneous hierarchical networks that use disparate communication hardware.

Generally, a device's EDD may specify parameters and methods or functions of the process control device or other electronic device. Importantly, the EDD may also include an organization for the parameters and functions of the electronic device. Because parameters for a field device may be too numerous to display all in one viewable screen, the EDD may specify that parameters be organized by data screens or views. In some instances, a viewable screen may be determined by the physical type and size of a physical display of the workstation hosting the user interface or HMI 24. For example, a certain physical window size of a display monitor and a corresponding minimum readable font size may be specified (e.g., by the EDD or by the host application) that limits the number of items or parameters that may fit in the window, view, or screen. Note that window, view, or screen is used interchangeably herein. The manner in which parameters are organized by views may be dependent on a number of factors including the type of process control device being specified by the EDD file. One factor affecting view organization may be the categorical nature of data sets being used by a device while another factor may be programmer or operator bias in which particular data sets are grouped by operator familiarity. In one example, parameters may be grouped in a manner corresponding to the way the parameters are recorded in a database used by the device. For example, the organization of the parameters may correspond to groupings based on type or function fields.

Accessing a process control device parameter may generally require traversing a hierarchical set of device view screens containing various parameters sets until a particular view screen is reached containing a desired parameter. This manner of access via sequential view screens may also be a product of legacy systems in an industrial control industry where older field devices are designed to be accessed, controlled, and managed using sequential menus.

Figure 3:
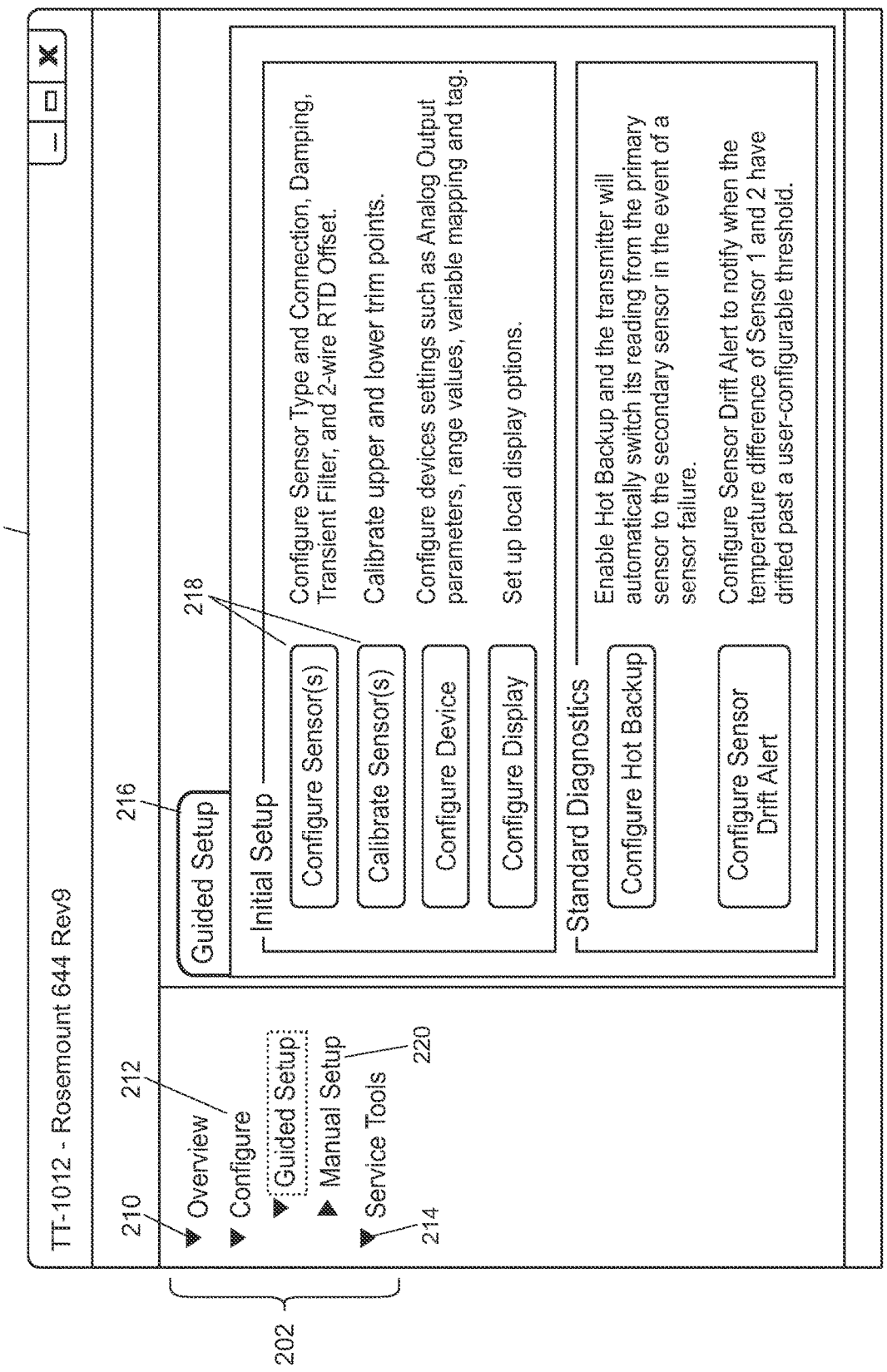
FIG. 3 illustrates a device screen specified by an EDD file for a temperature sensor.

FIG. 3 illustrates a device screen 201 specified by an EDD file for a process control field device. In this case, the field device is a temperature sensor, and more specifically, a Rosemount 644 temperature sensor manufactured by Fisher Rosemount Systems, Inc. An EDD file may typically designate a screen layout 201 such as that shown in FIG. 3. The layout 201 may include a menu of options 202 for accessing parameters and functions of the process control device. In particular, FIG. 3 illustrates a process variable root menu 210, a device root menu 212 and a diagnostic root menu 214. Generally, by clicking or selecting any of the options on the main screen 201, additional screens 216 with additional options 218 or parameters may be generated and displayed. When a user wants to access a parameter of a process control device or run any function, such as a diagnostic function, on the process control device, the user may access this first, main menu 201 when referencing an EDD or an XML equivalent rendering of an EDD reference/parameter through the EDD engine or interpreter. To access or find a particular desired parameter or function, the user may need to click, select, and/or expand menus and containers (e.g., view screens such as a sub-menu, a sub-window, dialogues, pages, etc.) until the desired parameter is reached. As discussed above, the organization of the parameters and data of the field device may be a product of a number of different factors but is generally different for each device, even those under the same category, e.g., sensors.

Figure 4:
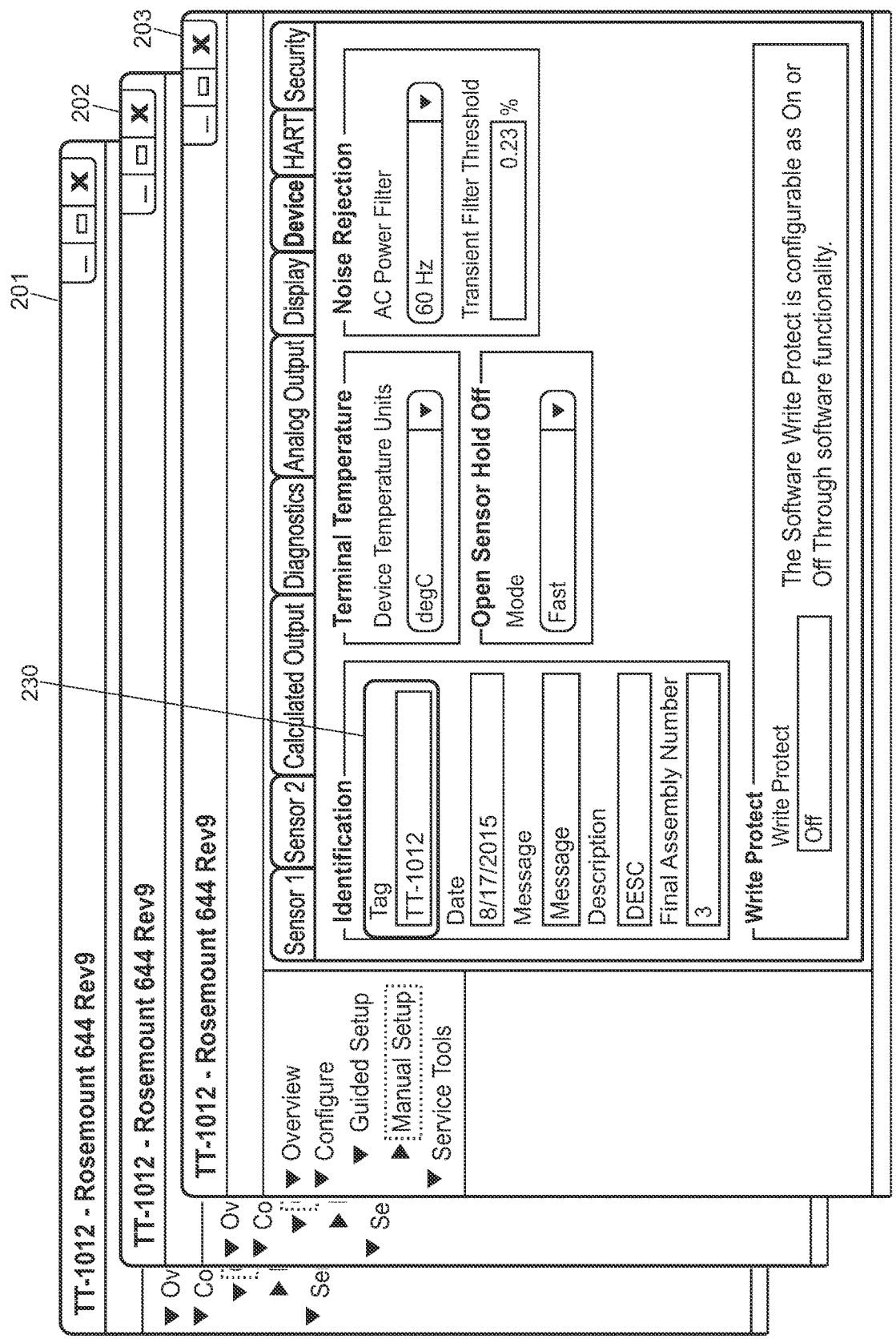
FIG. 4 illustrates a set of screens that may be navigated to reach a desired device parameter.

FIG. 3 illustrates a manual setup option 220 under a screen layout menu 201 which is a primary path or selection that a user may select to find a device tag parameter. An actual location of a desired device tag parameter may be manual setup 220 (second menu), device (seventh option of the second menu), identification (first option/group of the third menu option). FIG. 4 illustrates a set of screens 201, 202, and 203 that may be navigated by a user in order to reach a desired device parameter: device tag parameter 230. FIGS. 3 and 4 are a short example of a process that an inexperienced user may need to go through to access a particular device parameter of a process control device using an EDD file. Finding or accessing a desired parameter may involve a painstaking process of reading a multitude of options and sifting through many other variables till a user can reach a category or grouping (e.g., a view) that contains the user's desired parameter.

Figure 5:
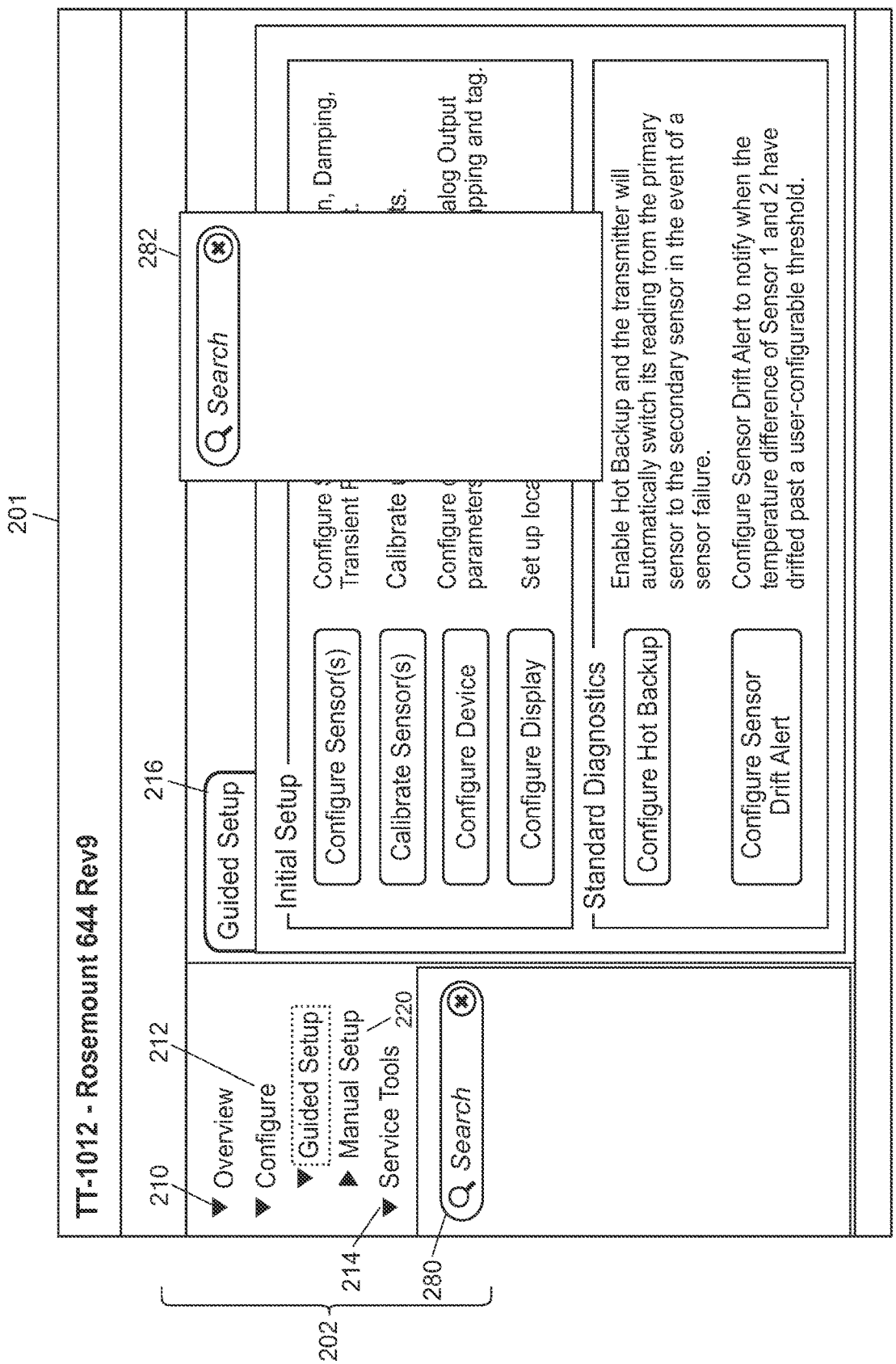
FIG. 5 illustrates a user interface using a search function to navigate to a desired process control device parameter of a multiple device screen system.

FIG. 5 illustrates an embodiment of a method and system of using a search function or feature to navigate to a desired process control device parameter. A search window, search dialog text box, or any other search display function 280 may be displayed on a user interface of a client device prompting a user to input or key in a search string or string specifier. As illustrated in FIG. 5, the search window may be integrated with the main menu console such as element 280 or can be a floating window such as element 282. After entering the search string a user may activate a first search function or first search algorithm by, for example, hitting or selecting enter or a search button. The search string may then be used as an input to a search function interface such as the one illustrated in FIG. 5.

Figure 6A:
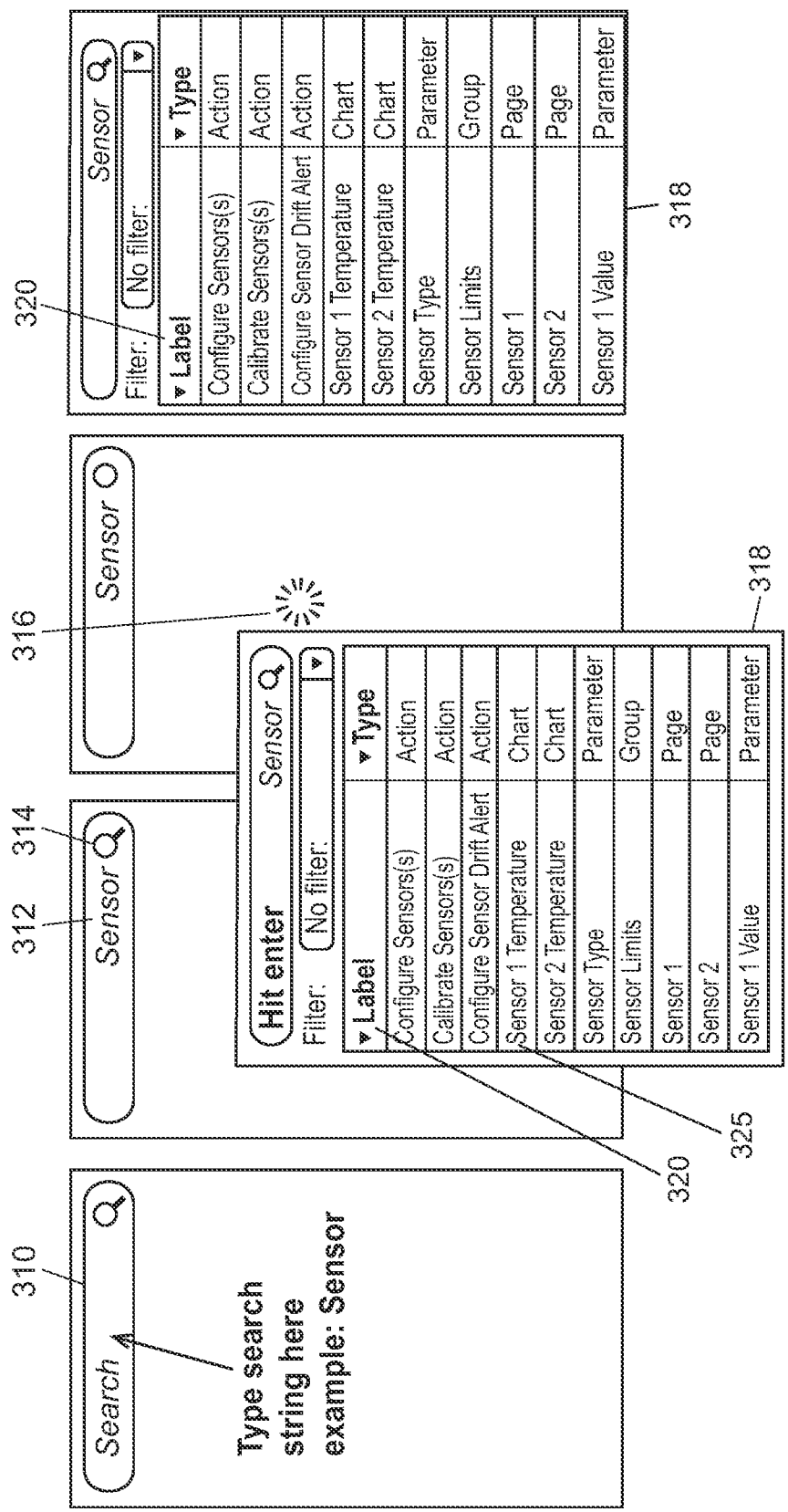
FIG. 6A illustrates user interface screens for an example search.
Figure 6B:
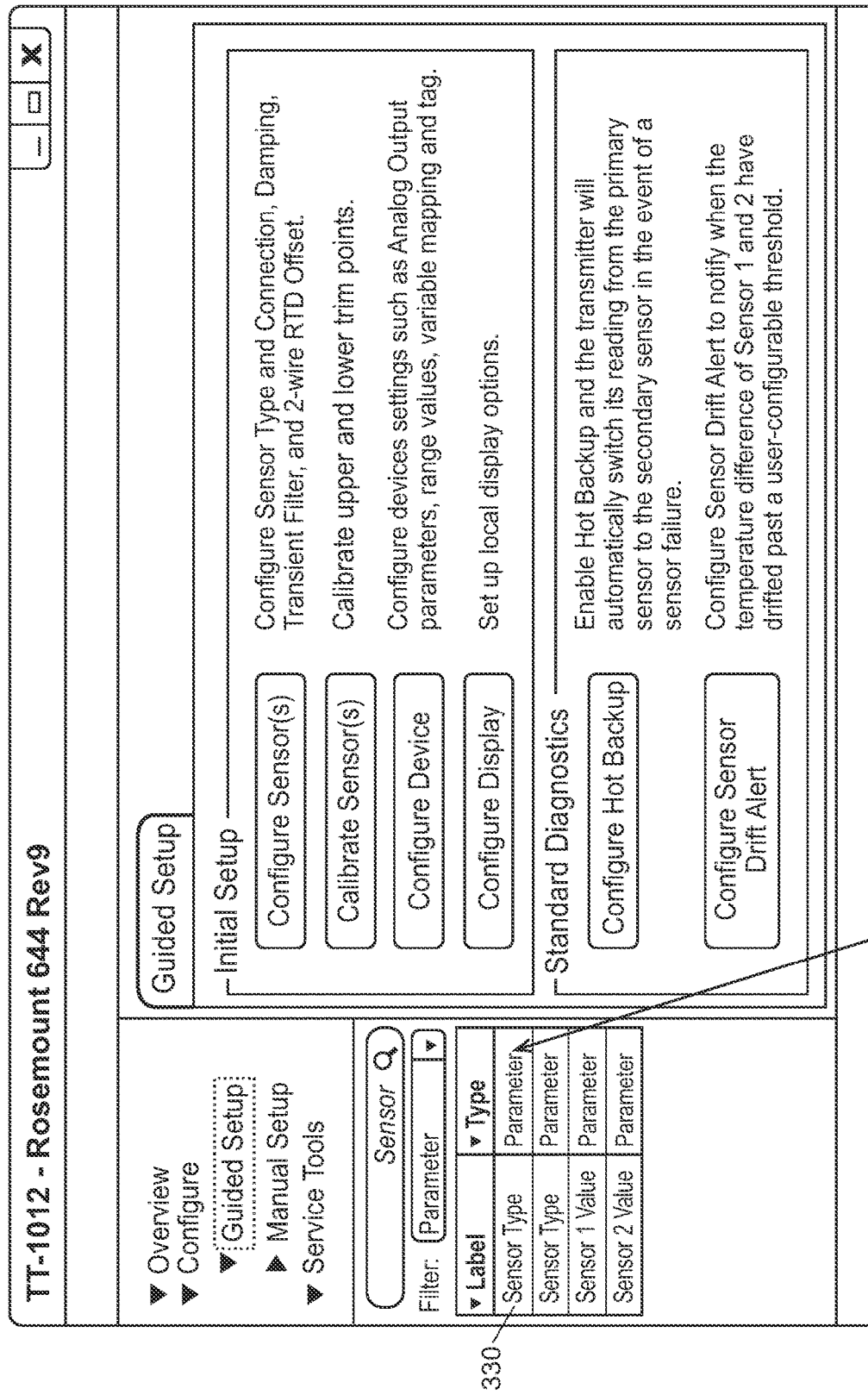
FIG. 6B illustrates a possible search results and options screen.
Figure 7:
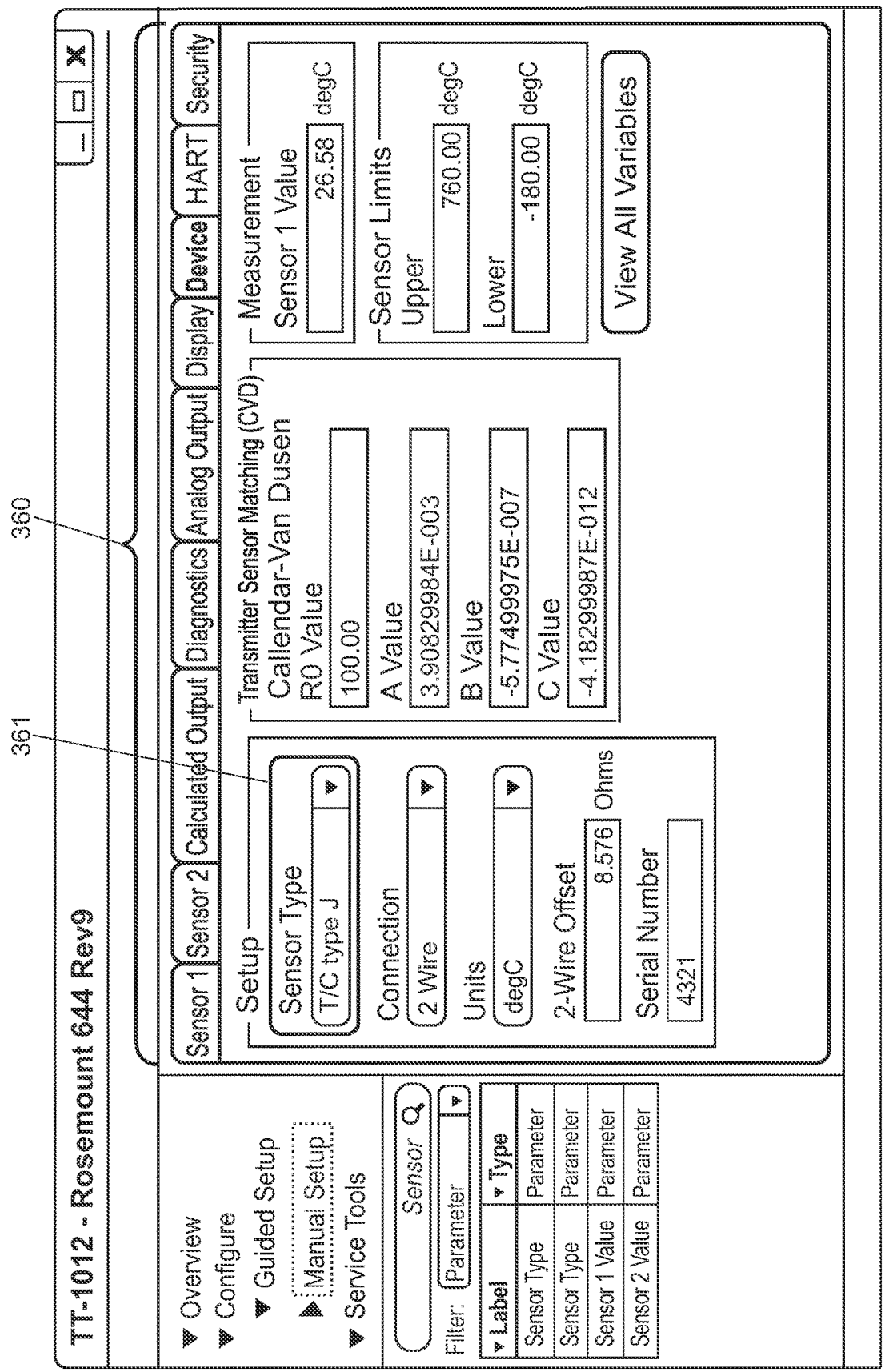
FIG. 7 illustrates a retrieved device parameter screen based on a search function.

FIG. 6A illustrates that a user may input a search string in the search text box 310. FIG. 6A illustrates entering a search string "sensor" 312 and then selecting the search button 314. The search function may have an intermediary screen 316 indicating that the search is in progress. In one embodiment, a first or preliminary result set of parameters 318 may be outputted from the search function. This first parameter result set 318 may be a set of device parameters that have an identifier 320 that matches or partially matches the search string entered by the user. From this preliminary result set, a user may select a desired parameter if it exists within the first result set and is readily seen. For example, in the display screen of FIG. 6B (similar to FIG. 6A), if the user's search string is "sensor" 312 and the user's desired device parameter is sensor type 330, then the user may simply select the desired device parameter 330 to retrieve or open a corresponding screen, menu, or layout object that contains the desired device parameter. In one embodiment, retrieving the screen, menu, or view object may include activating a link, such as an index, a shortcut, or address, etc. that will open (for example, render) an actual device parameter menu, screen, view or display layout containing the desired device parameter. The menu screen, view, or display layout may be specified by the device's EDD file. In an embodiment, retrieving the screen or view may include querying for a view that contains a parameter having an identifier associated with or matching the selected device parameter from the first result set. For example, the sensor 1 temperature parameter may have an identifier linking it to a particular view or device screen. A device parameter view may be queried or searched for based on the parameter identifier. At the same time, the device parameter view may also have an identifier and querying for the view may involve querying for the view identifier based on a parameter identifier. FIG. 7 illustrates a resulting view 360 from the user selecting or clicking on the desired parameter sensor type 330 in FIG. 6B. In an embodiment, the resulting view may be adapted to highlight the selected device parameter, such as using a ellipse 361.

Because the preliminary result set may return a large number of results, especially in the case of more complex field devices or controllers, the desired parameter may not be easily locatable upon a first search. For example, the parameter may not be on the first screen or even a second screen as the user may activate a scroll function to scroll down the parameters of the first result set. In one embodiment, the user may be provided additional search functions. In one embodiment, the user may continue to refine his search string. For example, the user may type "sensor 1" or "sensor temperature" thereby initiating a second search function or query to provide a second parameter result set. In this configuration, a search or query may be initiated after each new character is typed or inputted into a search box. The activation or implementation of this feature may depend on processing capacity for executing a plurality of searches as well as latency in returning results from a query. In situations where required processing capacity or latency is too high, an embodiment of the system may automatically disable this search-as-you-type feature and instead default to a search upon activation of entry or search button (i.e., the user needs to click to activate a new search).

Figure 8:
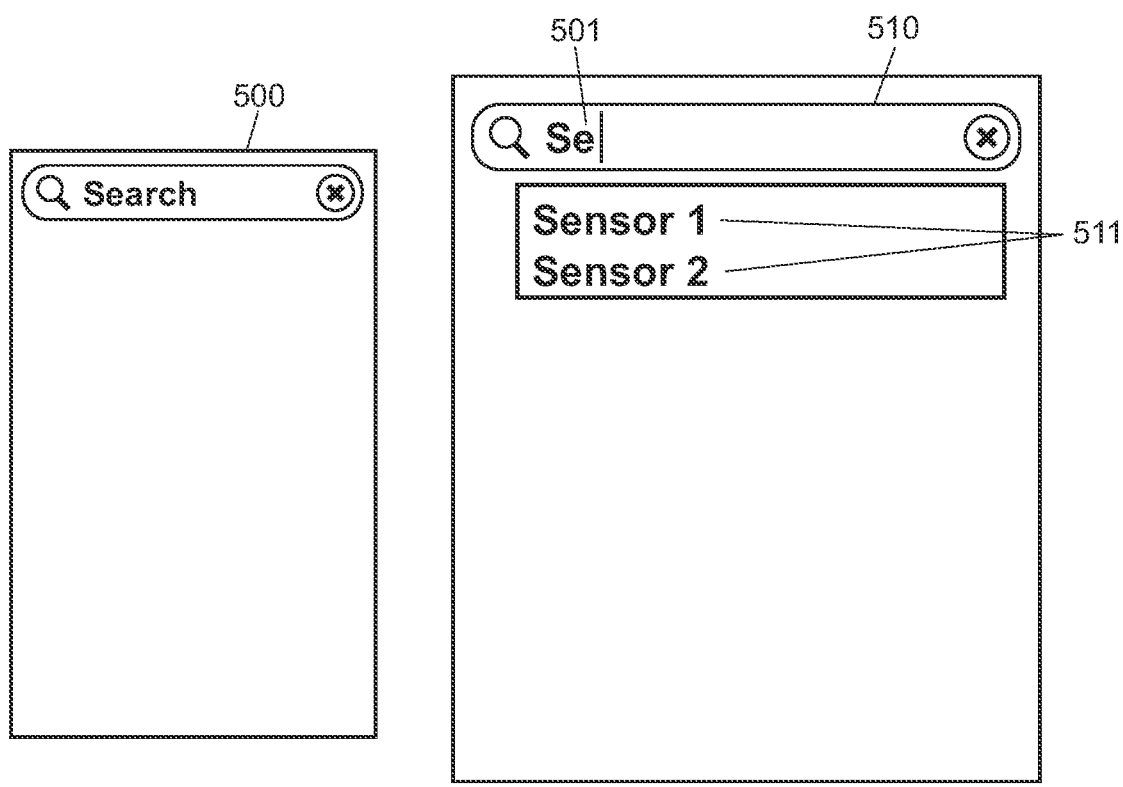
FIG. 8 illustrates a user interface for an auto suggest search function.

In some embodiments, an additional feature may be programmed to auto suggest results as illustrated in FIG. 8. In this feature, a user search string may be recorded in a cache (e.g., memory). The display search function may include recursively searching the cache as the user is typing each character to match a user inputted search string. FIG. 8 shows an initial search interface 500 without any inputted text. In this embodiment, as a user search string 501 is typed into a search box 510, the search function may provide matches 511 to previously entered, cached search strings that are displayed to the user as a suggestion of terms. The user may then click on a suggestion 511 which then can be used for the first search function.

Figure 9:
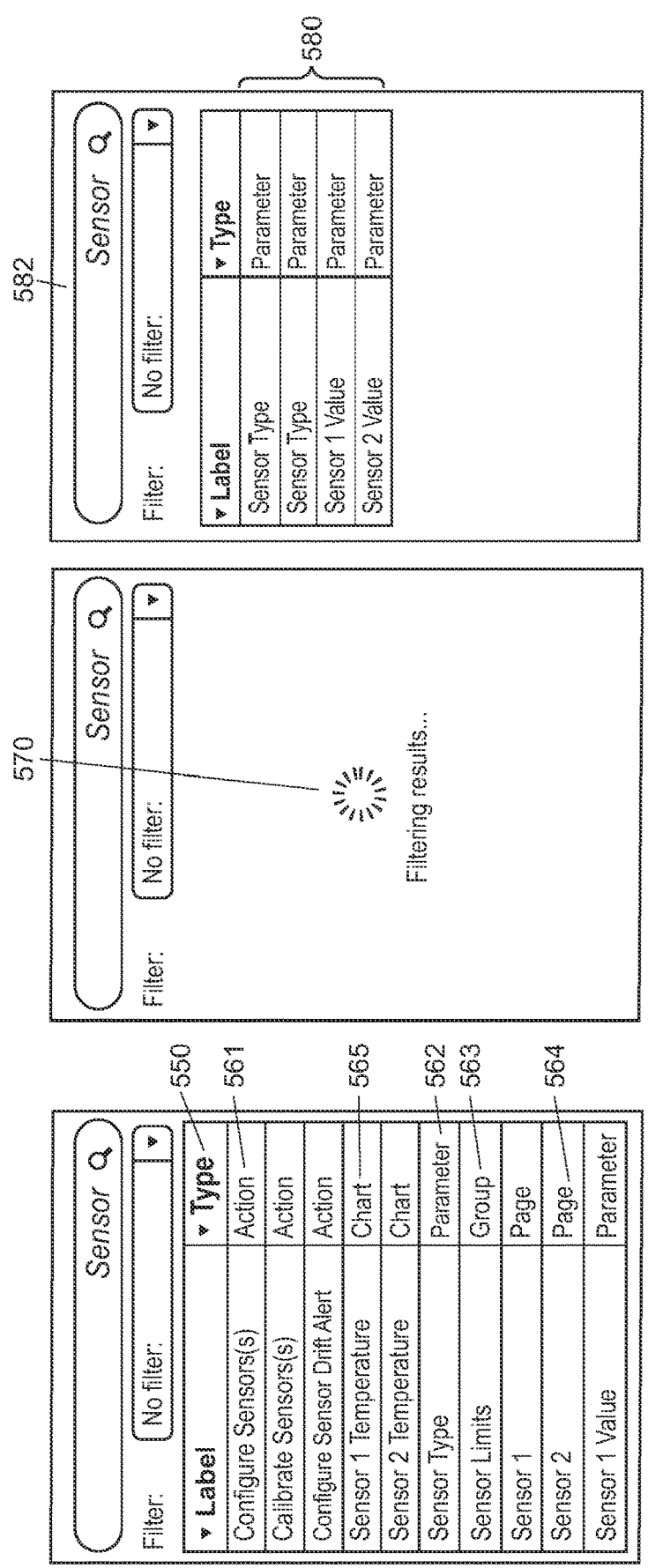
FIG. 9 illustrates a user interface to filter search results by a parameter type or category.

In one embodiment, as part of the first parameter result set an additional field such as a category of the device parameters may be displayed to a user. In this situation, the user may have the option of initiating a second search function or query where a second parameter result set displays the matching parameters by category of device parameter. The second search function may be a filter that matches or groups parameters in the first result set by an additional field identifier, such as a category field. As illustrated in FIG. 9, the Rosemount temperature sensor may have device parameter categories such as action 561, parameter 562, group 563, page 564, chart 565, etc. In an embodiment illustrated in FIG. 9, selecting or clicking on a parameter category 561-565 may cause an additional search or filter to be initiated 570 where only parameters belonging to that category appear or are displayed in a search result box 580. In other embodiments, clicking on the parameter category may reorganize the results so that the parameters are listed by category, with all parameters still being displayed. Similar to the user finding a desired parameter within the first parameter result set, once the user selects one of the parameters from the second parameter result set a corresponding view, screen, menu, and/or layout object that contains the desired device parameter may be retrieved and displayed.

Figure 10:
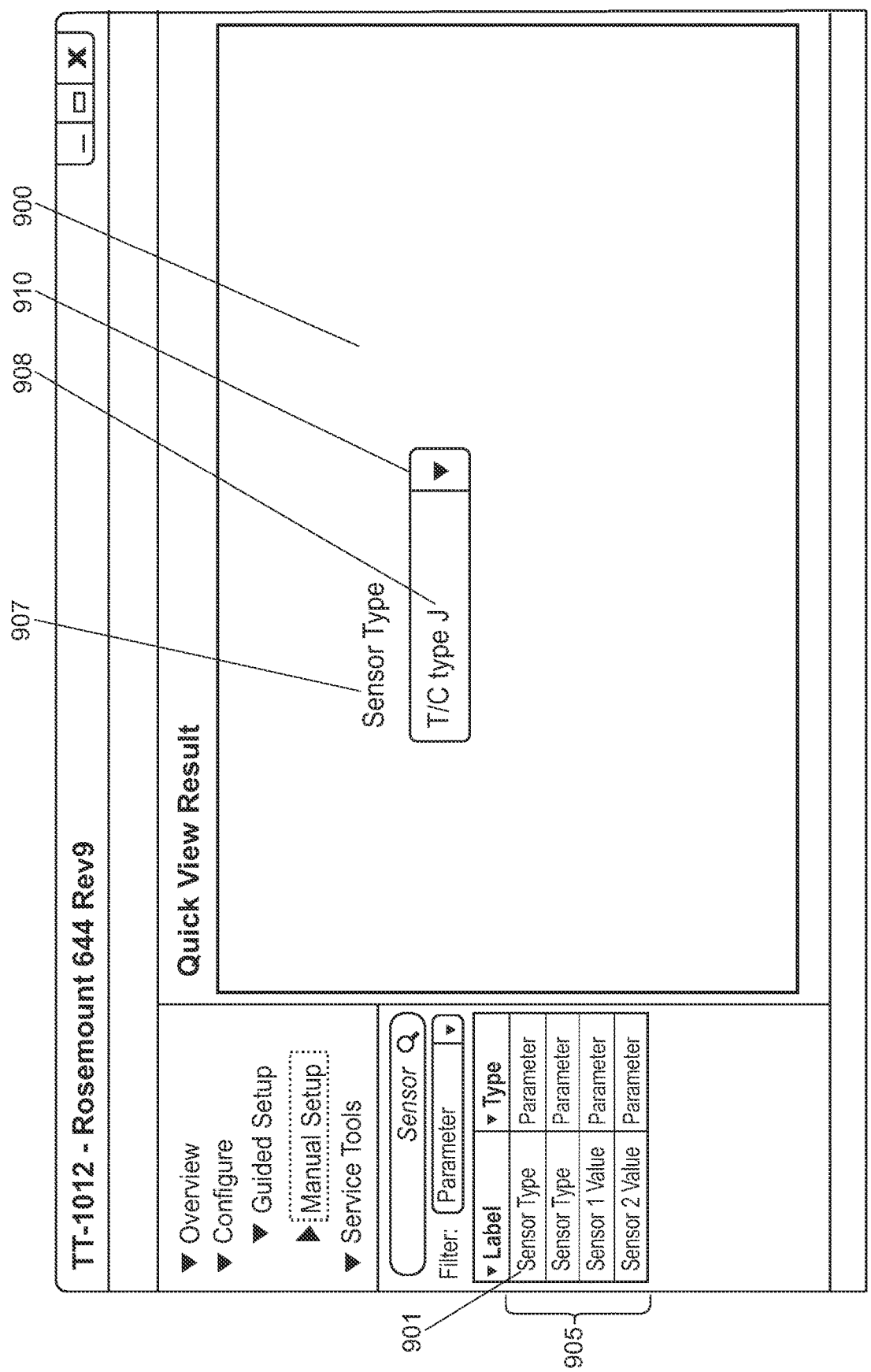
FIG. 10 illustrates a user interface for a quick view search function.

FIG. 10 illustrates an embodiment of a quick view function or partial view function. In FIG. 10, a partial view 900, or described herein as a quick view, of a device parameter screen may be displayed when a selected device parameter 901 of the first parameter result set 905 or a second parameter result set is displayed in list form. In some embodiments, hovering a display pointer (not shown) over a parameter in the parameter list result 905 may activate the quick view 900 of that single parameter 901. In other embodiments, the process may forego displaying a full device parameter screen upon user selection of a device parameter and instead show a quick view 900 of the user selected device parameter 901. In this embodiment, a query may be made to find a limited set of display characteristics for a view containing the selected parameter. For example, display characteristics for the selected parameter may be queried or retrieved for display instead of display characteristics for an entire window, view, or screen. FIG. 10 illustrates a quick view 900 of a parameter of the sensor device. In this illustration, only a parameter identifier 907 and parameter value 908 of a selected sensor parameter is displayed. The display 900 of FIG. 10 may be only a portion of a full or complete view 360 containing the same parameter (element 907 and element 360) as illustrated in FIG. 7.

In an embodiment, display attributes may be used to show a quick view of a parameter as illustrated in FIG. 10. The manner in which the single parameter is displayed in FIG. 10 may be dependent on display attributes such as arrangement of text, use of a drop down text box, etc. For example, the position of the parameter identifier 907 over the parameter value 908 and the use of a drop down text box 910 may be information contained in a set of display attributes for the parameter 907. In an embodiment, the display attributes of the selected device parameter may belong to a menu view containing the selected device parameter. For example, the placement of the parameter label 907, and the use of the drop down box 910 may be the same as for that in FIG. 7. In a different embodiment, the display characteristics for device parameters selected from a search result as described above may use a different set of display attributes.

Although the quick view 900 of FIG. 10 displays the single selected device parameter, if the selected device parameter has correlated parameters that are specified to be read or modified together, then the set of correlated parameters may be displayed along with the selected device parameters in the quick view. In some embodiments these correlated variables or parameters may be described as having a Write As One relationship. It should be noted, however, that a display of multiple Write As One parameters may still represent only a portion of a full device parameter screen or view. Displaying a quick view may therefore require less rendering time and shorter latency than displaying a full device parameter screen or view.

Figure 11:
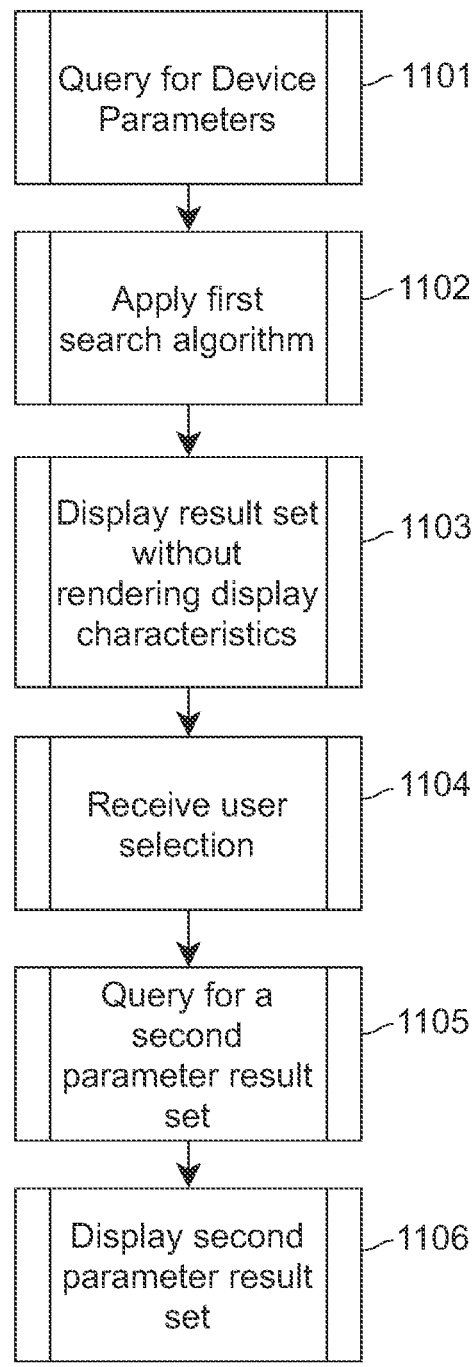
FIG. 11 illustrates a block diagram of a method or process of locating a desired device parameter.

FIG. 11 illustrates a block diagram of a method or process of locating a desired device parameter specified by an EDD using a user interface search function. This method may be implemented in a system such as the system illustrated in FIG. 1 or the system illustrated in FIG. 2. At block 1101, a computing device may query for a set of device parameters associated with an electronic device having an electronic device description (EDD). In some embodiments, this set of device parameters may include an index of parameter identifiers. The identifiers may be text characters that uniquely identify or name the parameters. In another embodiment, a getAllParameters( ) function may be created by modifying a set of existing EDD functions and/or by inserting a new set of functions in an EDD file. The getAllParameters( ) function may query for an index of parameters stored in the EDD file of the electronic device. In another embodiment, the getAllParameters( ) function may query the electronic device for an index of all its device parameters. In yet another embodiment, the getAllParameters( ) function may query a storage medium associated with an electronic device (such as a device database) for the set of device parameters. Generally, the getAllParameters( ) function may provide a set of all primary text identifiers of each device parameter or function associated with a target device as specified by the target device's EDD file or based on what is queried from a storage medium for the electronic device. In some embodiments, the storage medium may be a memory of the electronic device.

At block 1102, the method and system may apply a first search algorithm to the results of the getAllParameters( ) function based on a user inputted search string. The first search algorithm may be adapted to find matches in characters between the user search string and the index of device parameters from the getAllParameters( ) function. The first search algorithm may output a first parameter result set including each parameter of the target device having a text identifier matching or partially matching the user search string. At block 1103, the method and system may display a simple listing of the first parameter result set, where only simple text may be displayed to indicate the first parameter result set.

In some implementations, calling a getAllParameters ( ) function may inextricably provide attributes and parameters in addition to the device parameter identifiers, such as a layout object or a set of display characteristics. An example is when calling a getAllParameters( ) function results in additional parameters and functions related to a device parameter view that is referenced or indexed to a device parameter. In another example, a device parameter such as "sensor type" may inextricably include graphical elements such as a position of the parameter on a GUI, a color of how the parameter should be displayed, a texture, or whether it will be displayed in a graphical object, such as a graph, chart, table, image, etc. This may be the case in embodiments where the getAllParameters( ) function is derived by modifying a set of existing EDD functions that are already programmed to return additional display parameters and functions. In some cases, the additional display data may be a product of the way the electronic device communicates with an EDD engine to retrieve parameter data. For example, the device may be programmed to always provide display characteristic data with parameter or device function data.

At block 1103, the claimed method and system may display a list of the first parameter result set without rendering display characteristics attributed to or associated with the first parameter result set. In some embodiments, the first parameter result set may be displayed without rendering additional display components retrieved from the EDD file or retrieved from a query of the device parameters. For example, the first parameter result set may include display attributes as part of the set of device parameters queried by the getAllParameters( ) function at block 1101. Block 1103 may forego rendering these display attributes in the first parameter result set. Generally, the process of rendering may involve processing one or more display characteristics of an element, such as color and texture of how to display a device parameter, to produce a visual representation of the element. In these embodiments, the method and system may render a simple text listing of the first parameter result set by using default system display characteristics used by a host system or default display attributes of a markup language used by the EDD engine (e.g., XML or JSON) to provide visual representations of EDD parameters and functions to the HMI.

Generally, rendering additional graphical specifications or display characteristics for the first parameter result set may be a concern because rendering additional display data may require additional processing capacity and increase latency in providing search results to a user's display device. For example, the EDD file may include very complicated graphical specifications for a particular parameter. By foregoing the rendering of the additional display characteristics, the time needed to retrieve the result set as well as provide a readable display of the first parameter result set may be greatly reduced.

In some embodiments, the block 1103 may be executed by modifying the EDD engine or interpreter. In these embodiments, the method at block 1103 may display a list of the first parameter result set without rendering display characteristics by programming an EDD engine to forego including display characteristics in a result of the getAllParameters( ) function. In one embodiment, this may be executed by filtering out the additional display characteristics, leaving only a set of bare text parameter identifiers for display. Because some EDD interpreters may take a long time to generate results, process block 1103 may speed the response time required to show a user the results of an initial device parameter query. The user may simply need to identify the closest matches in the first parameter result set for further investigation or final selection, and this may be done using a simple text listing of the first parameter result set.

Furthermore, an EDD based search or query may involve communication between the EDD engine/interpreter and the electronic device (for example, to request actual parameter values). Foregoing rendering processes to translate display characteristics may also prevent communications with the device that could increase latency. In other words, to render certain views of parameters, the EDD engine may need to communicate or query the electronic device to retrieve certain parameters or parameter values or to initiate or execute some logic within the electronic device itself, thereby causing additional delay in time required to send a query to the device (e.g., via slow communication lines) and time of device processing required to answer a communication or query.

At block 1104, a user may select a particular device parameter and the described system may receive the user selection. In one embodiment, a user may select a single desired parameter of the first parameter result set. The user selection may be received by an input device of the user interface such as a keyboard or mouse. In an embodiment, the user may click on a desired device parameter from the first parameter result set. For example, the user may select one of the parameters listed in FIG. 6A. In another embodiment, additional searches may be performed until a user selects a device parameter from additional search result sets as illustrated in FIG. 9.

At block 1105, the described method and system may query for a second parameter result set based on the user selection at block 1104. The query may return display attributes of the user selected device parameter. The query may also request a current parameter value of the user selected device parameter from the electronic device. Because of high latency in some connections to electronic devices such as field devices, in an embodiment, only attributes and values for the user selected device parameter may be queried or retrieved from the electronic device. The query may return information for displaying the user selected device parameter in a quick view such as illustrated in FIG. 10. The quick view may contain the user selected device parameter alone or together with any correlated write-as-one parameters of the user selected device parameter. The quick view may be considered a device parameter view of a single device parameter that is part of the described process. This quick view may be separate and distinct from any sequential menu view that is specified by an EDD as part of a hierarchical menu driven access process as described above. In an embodiment, block 1105 may query for display attributes of the selected device parameter which are affiliated with a device parameter menu screen. In another embodiment, block 1105 may query for display attributes not affiliated with a device parameter menu screen. It should be noted that the device parameter menu screen may be programmed or specified by the EDD as part of a manufacturer default program, whereas the described method herein may be implemented as an add-on program in an existing EDD or as an additional EDD. Thus, in one implementation, the described search functionality may manipulate existing functions of a manufacturer provided EDD where the quick view, representing a distinct view from the manufacturer specified device screens, may use display attributes not included in the manufacturer specified device screens.

In an embodiment, some conditions may be implemented to check whether to forego displaying an EDD specified device parameter menu and instead display a minimal rendering view, such as a quick view. For example, in an embodiment in which network latency is determined to be high and/or electronic device processing capability is low (e.g., legacy field device), the block 1105 may automatically forego rendering a device parameter view from an existing EDD menu hierarchy when executing the described search function and in lieu of the standard menu driven device parameter screen, conclude a search with just a quick view of the parameter or parameter and its write as one co-parameters.

In an embodiment, block 1105 may include retrieving a menu device parameter screen or view as designated by an EDD and part of an EDD specified default series of menus, as described above. An EDD specified device parameter view such as those illustrated in FIGS. 3-4, may be composed of a complete set of parameters and information on how to display those parameters on a graphical user interface (GUI). The EDD specification may contain instructions or data indicating such things as position, color, texture, shape, etc. for the device parameters in relation to each other and may include additional graphical elements such as graphs, charts, and tables in which to display one or more device parameters. In one embodiment, the first parameter result set may include a link to the device parameter screen, thus reducing the need to search from scratch for the device parameter view. In an embodiment, the device parameter screen may be defined by a database view or a database table, and the link may be an identifier of the view or table. In some embodiments, the parameter information required for a device parameter screen or view may be retrieved from a markup language file generated based on an EDD file. For example, in an embodiment, block 1105 may retrieve display attributes for a selected device parameter by searching through an XML or JSON file representing a device menu containing the selected device parameter. It should be noted, however, in some embodiments additional parameters of the device parameter screen may need to be searched or queried in order to provide a complete view for display or rendering. Block 1105 may perform retrieval of the device parameter view as well as query for any additional parameters or current parameter values (for example, initiating methods that communicate with the device corresponding to an EDD to obtain current parameter values or initiate calculations performed by the device to derive parameter values) necessary to render a device parameter view. In an embodiment, block 1105 may initiate an update of a database view containing the information designed to be displayed in the device parameter view. In an embodiment, the block 1105 may query the view without updating the view, where updating the view may include communication with the electronic device to read current parameter values or to calculate and process certain parameter values. Querying a non-updated database view or querying an updated database view may draw more processing capacity than a limited parameter query such as the that based on the quick view above (for a single parameter or single parameter including write as one related parameters).

At block, 1106 a rendering function or program may be used to render the device parameter screen containing the selected or desired device parameter. In some embodiments, the desired parameter may be highlighted in the rendered device parameter screen, such as element 361 in FIG. 7. In some embodiments, only the user selected parameter is displayed in block 1106 (e.g., quick view). In this embodiment, block 1106 may still render display characteristics of the user selected parameter as retrieved from block 1105 and illustrated in FIG. 10. In this embodiment, an additional process block may include receiving a user preference for a quick view of the user selected device parameter alone in block 1106 or a view containing a menu or other parameters including the user selected device parameter. In some embodiments, a user preference may determine whether the process at block 1105 will query for information for the user selected device parameter alone or for a plurality of device parameters and device parameter values for an existing menu device parameter view that includes the user selected device parameter. It should be noted that for high latency devices or devices connected via slow communication lines, the described method may decrease response time for accessing a user selected device parameter by foregoing retrieving and rendering of a view with other parameters of the standard hierarchical menu that the user may not interested in. Instead, the process may solely retrieve and render information for displaying just the user selected device parameter.

As discussed above, an EDD file may contain various instructions on how to display a set or menu of parameters. This may include position of each parameter, GUI components such as containers: drop down menus, list boxes, etc., as well as color, texture, contrast between components, text fields, buttons, checkboxes, combo boxes, labels, lists, text fields, etc. When an EDD engine or interpreter processes an EDD file, the EDD engine may generate visual representation files of the device parameter screens specified in the EDD. In an embodiment, the visual representation files may be a set of pages written in a markup language such as extensible markup language (XML) page or JavaScript object notation (JSON) page. At block 1106, the XML or JSON files may be displayed at a user interface similar to a web browser. At block 1106, the user interface device parameter screen may be displayed including all images, graphs, charts, tables, and other display objects. The described search function may be used to bypass the intermediate sequential hierarchical menu screens (e.g., FIGS. 3-4) to access a desired parameter or a device screen that includes the desired parameter.

The described process and method may be implemented using one or more components of an EDD based process control device access system. For example, some of the function blocks may be executed in one component of the EDD system while other functions blocks may be executed in a different component of the EDD system. Below are example implementations for the processes and methods described above.

In one embodiment, an existing EDD for a process control device may be modified by, for example, inserting programming code to perform the search functions described above. In this embodiment, additional device parameter specifications, business logic and/or user interface description (UID) code may be inserted into an already existing EDD to implement the search functionality. In this embodiment, the search functionality may become an integral part of the user interface specified by an EDD. In one particular embodiment using an FDI system, an existing EDD may be modified to include the search functionality as part of the user interface description (UID) of the EDD.

In an embodiment, the EDD engine may be modified to implement the described search functionality without modifying existing device manufacturer provided EDD files. In one instance, the EDD engine may be programmed to execute an additional program module that is adapted to include the search functionality described above. For example, the EDD engine may be adapted to execute functions such as the getAllParameters( ) function for a particular device when the EDD for that device is loaded or interpreted by the EDD engine. The EDD engine or interpreter may then proceed to execute the other process blocks described above to build a visual representation of a user search interface for the device (e.g., via a set of XML or JSON pages).

In an embodiment, the search functionality may be implemented as a display overlay over the visual representation specified in the EDD file by the manufacturer. For example, in the display illustrated by FIG. 5, the device manufacturer specified user interface may include window elements 202-220, while the search window 280 or 282 is an overlay generated by the EDD engine. In this manner, the EDD engine may be adapted to execute the claimed search process using functions exposed by the EDD of the device.

In other words, in one embodiment, the EDD engine may implement the search functionality by calling up EDD specified functions, such as the getAllParameters( ) function and then manipulate the result set as described in the method and process above and generate visual representations in the form of XML or JSON for display as a search user interface.

In one embodiment that involves an FDI system in a process control plant, the FDI device package may be modified to include a UIP component that executes the described search functionality. For example, in instances where an existing EDD provides exposed functions that can be accessed by a UIP or other host processor program, the described process and method may be implemented in the UIP. The UIP may initiate, for example, a getAllParameters( ) type function provided by the UID via the graphical user interface at the FDI client. The other blocks 1102-1106 may then be executed or initiated by a host process on a client computing device that is also running the UIP.

In another embodiment involving an FDI system, the described method may be implemented in the UID, UIP, or a combination of both UID and UIP. For example, the search functionality may be partially implemented with EDDL in the UID with remaining enhanced search functions written into the UIP. In an embodiment, the UID may include a function that initiates a getAllParameters( ) type function and provides the list of device parameters and functions in a generic container (e.g., a text box). In this embodiment, the UIP may be programmed to filter, query, and search for parameters in the text box as described above.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a ram or rom of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "as used herein, the term '_____' is hereby defined to mean . . . ." Or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of displaying parameters of an electronic device having an electronic device description (EDD) interpreted by an EDD interpreter executed on a host computing device, the host computing device communicatively coupled to at least the electronic device, comprising:
   querying for a set of device parameters associated with the electronic device;
   applying a first search algorithm to the set of device parameters based on a first user search string to produce a first parameter result set;
   displaying the first parameter result set without rendering display attributes associated with the first parameter result set retrieved from querying for the set of device parameters, wherein displaying the first parameter result set without rendering display attributes associated with the first parameter result set includes displaying text characters of parameter identifiers of the first parameter result set without rendering display attributes specified in a markup language the generated based on the EDD;
   receiving a user selected device parameter selected from the displayed first parameter result set;
   querying for a second parameter result set based on the user selected device parameter; and
   displaying the second parameter result set including display attributes associated with the second parameter result set, wherein the display attributes associated with the second parameter result set include display attributes specified in the markup language the generated based on the EDD.

2. The method of claim 1, wherein querying for a second parameter result set includes querying for display attributes of the user selected device parameter and requesting a current value of the user selected device parameter from the electronic device.

3. The method of claim 2, wherein the display attributes are separate and distinct from display attributes of a sequential based menu screen view.

4. The method of claim 1, wherein querying for a second parameter result set includes querying a view for display attributes of the user selected device parameter and requesting a current value of the user selected device parameter from the electronic device, wherein the display attributes describe the visual representation of the user selected device parameter within the view and wherein the view includes a plurality of device parameters.

5. The method of claim 4, further including displaying the user selected device parameter with view display attributes and the current value of the user selected parameter without rendering an entire view containing the selected device parameter.

6. The method of claim 1, further including retrieving a view defined at least by a subset of device parameters of the electronic device and a set of display attributes for each of the subset of device parameters, wherein the user selected device parameter is one of the device parameters of the view and wherein querying for a second parameter result set includes sending a request to the electronic device for current values of the set of device parameters contained in the view.

7. The method of claim 6, wherein the set of device parameters includes a set of attributes including a parameter name, a parameter type, and a parameter identifier and wherein retrieving a view includes querying for an identifier of the view based on the parameter identifier associated with the user selected device parameter.

8. The method of claim 7, wherein displaying the second parameter result set includes displaying a current value of the user selected device parameter.

9. The method of claim 7, further including filtering the first parameter result set by parameter type, wherein the parameter type indicates one of a set of EDDL layout objects, the set of EDDL layout objects including parameter, window, dialog, group, page, chart, graph, menu, grid, action, and user interface plug-in (UIP) control.

10. The method of claim 1, wherein displaying the first parameter result set and displaying the second parameter result set includes rendering one of an extensible markup language (XML) page or JavaScript object notation (JSON) page that is generated by the EDD interpreter based on the EDD.

11. The method of claim 1, wherein querying for the set of device parameters associated with the electronic device includes modifying the EDD interpreter to search through the markup language file generated based on the EDD.

12. The method of claim 1, further including storing the first user search string in a cache of search strings, applying a third search algorithm on the cache of search strings based on the user input to generate a list of search suggestions, and displaying the list of search suggestions.

13. A computing device for accessing parameters of an electronic device communicatively coupled to the computing device, the computing device comprising:
a display device that renders a user interface and receives input from a user;
one or more processors; and
a memory storing executable instructions that cause the processors to execute:
an electronic device description (EDD) interpreter application for communicating with the electronic device and adapted to translate an EDD specified sequence of device parameter views, from an EDD file written using electronic device description language (EDDL), wherein each device parameter view contains a set of parameters of the electronic device, into a set of markup language files, wherein the markup language files include at least one of an extensible markup language (XML) page or JavaScript object notation (JSON) page;
a rendering component application adapted to:
render, via the display device, the user interface based on the markup language file;
query for a set of device parameters associated with the electronic device;
apply a first search algorithm based on a first user input to the set of device parameters to produce a first parameter result set;
display, via the display device, the first parameter result set without rendering display characteristics associated with the first parameter result set retrieved from querying the set of device parameters, wherein displaying the first parameter result set without rendering display characteristics associated with the first parameter result set includes displaying text characters of parameter identifiers of the first parameter result set without rendering display characteristics specified in a markup language file generated based on the EDD;
receive a user selected device parameter selected from the displayed first parameter result set;
query for a second parameter result set based on the user selected device parameter; and display, via the display device, the second parameter result set including rendering display characteristics of parameters of the second parameter result set, wherein the display characteristics of parameters of the second parameter result set include display characteristics specified in the markup language file generated based on the EDD.

14. The computing device of claim 13, wherein the EDD file is adapted to implement the rendering component as part of a user interface description (UID) of the EDD.

15. The computing device of claim 13, wherein the electronic device is a field device in a process plant, the EDD is a component of an FDI device package conforming to field device integration (FDI) standard, and the EDD interpreter is an FDI EDD engine, and wherein the user interface is adapted to execute the rendering component as part of a user interface plug-in (UIP) component received from the FDI EDD engine, and wherein the UIP component is adapted to be executed by the computing device operating system.

16. The computing device of claim 13, wherein the rendering component is adapted to be partially executed by a user interface description (UID) of the EDD, wherein the UID is adapted to initiate the query for the set of device parameters.

17. The computing device of claim 16, wherein the rendering component is adapted to be partially executed in a user interface plug-in (UIP) that is executed by the computing device operating system, wherein the UIP is adapted to apply the first search algorithm on the set of device parameters.

18. The computing device of claim 13, wherein the EDD interpreter is adapted to execute the rendering component on the set of markup language files generated based on the EDD file.

19. A system of accessing field device parameters of a process control system using electronic device descriptions to specify a communication interface between a field device and a workstation remote from the field device and communicatively coupled to the field device comprising:
a server comprising one or more processors and a memory storing executable instructions that cause the one or more processors to execute an electronic device description engine (EDD engine) that stores at least one electronic device description (EDD) corresponding to the field device, and
wherein the workstation comprises one or more processors and a memory storing executable instructions that, when executed by the one or more processors, cause the one or more processors to:
receive markup language files for rendering a view generated by the EDD engine based on the electronic device description, wherein the view includes a plurality of parameters to be rendered on a single displayable window;
query for a set of device parameters associated with the electronic device;
apply a first search algorithm based on a first user input to the set of device parameters to produce a first parameter result set;
display the first parameter result set to the user without rendering display characteristics of the first parameter result set retrieved from querying for the set of device parameters, wherein displaying the first parameter result set without rendering display characteristics associated with the first parameter result set includes displaying text characters of parameter identifiers of the first parameter result set without rendering display characteristics specified in a markup language the generated based on the EDD;

receive a user selected device parameter selected form the displayed first parameter result set;

query for a second parameter result set based on the user selected device parameter; and display the second parameter result set including rendering display characteristics of parameters of the second parameter result set, wherein the display characteristics of parameters of the second parameter result set include display characteristics specified in the markup language file generated based on the EDD.

\* \* \* \* \*